May 21, 1935. H. KOHANEK 2,002,401
RUG HOOKING DEVICE
Filed Aug. 14, 1934
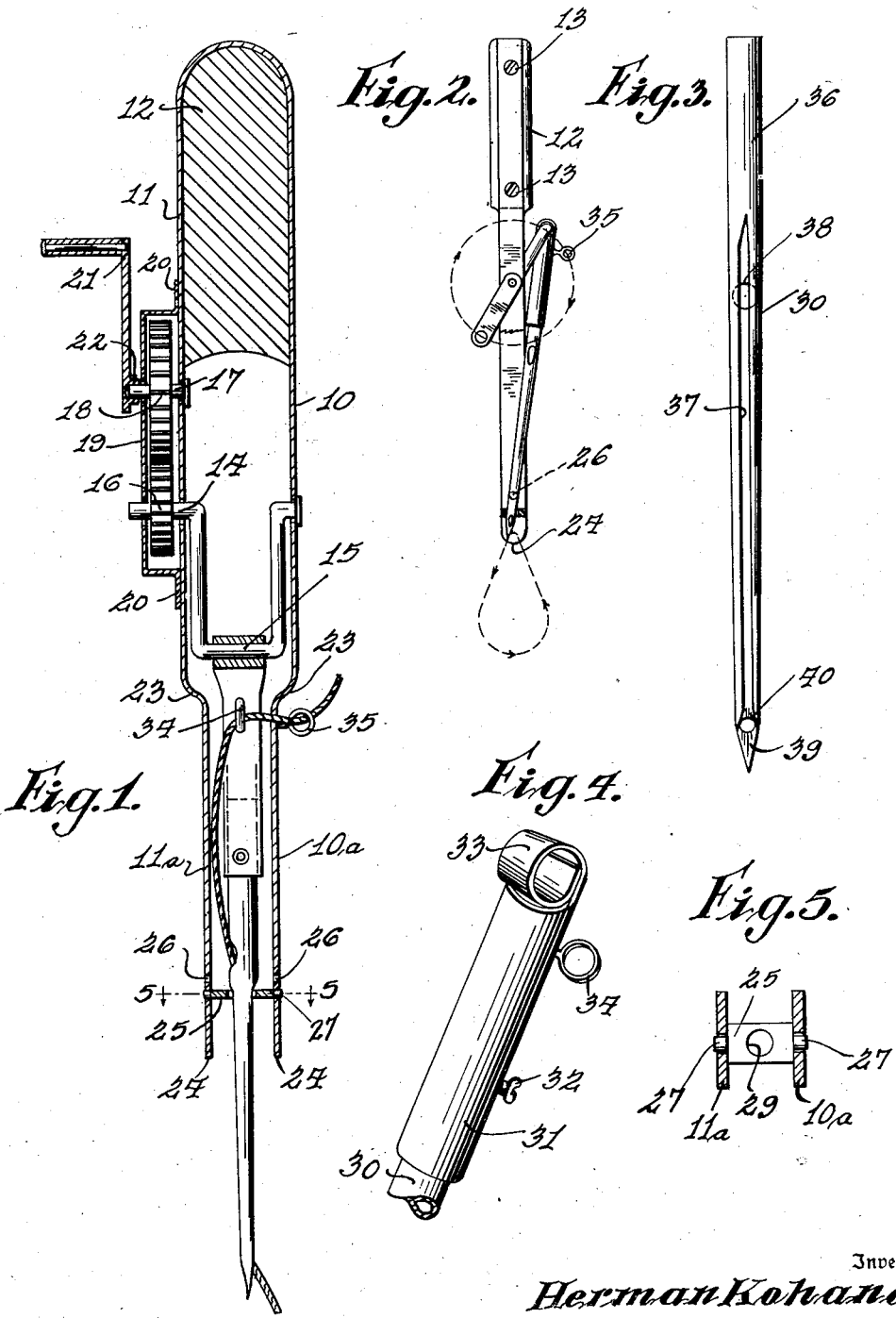
Inventor
Herman Kohanek
By Geo. L. Kimmel
Attorney Patented May 21, 1935

2,002,401

UNITED STATES PATENT OFFICE 2,002,401

RUG-HOOKING DEVICE

Herman Kohanek, Portland, Oreg.

Application August 14, 1934, Serial No. 739,821

6 Claims. (Cl. 112—80)

My present invention relates generally to a turfing implement for making hooked rugs and the like, with yarn, coarse thread or fabric strips, and has for its primary object the provision of a novel and simple implement which will be strong and durable in use and may be readily and cheaply manufactured.

A further object of my invention is the provision of an implement as above, which embodies various simple and effective adjustments, the speed of which may be readily controlled, and which works backward or forward with equal facility and efficiency.

With the above in mind, the further objects, relating for the most part to the details of construction, arrangement and operation of my improved implement, will be apparent from the following detailed description thereof with reference to the accompanying drawing, which forms a part of this specification, and in which Figure 1 is a vertical longitudinal section through the implement.

Figure 2 is a side view, on a reduced scale, and partly broken away and in section.

Figure 3 is an enlarged detail side view of the needle.

Figure 4 is an enlarged detail perspective view of the needle holder, and

Figure 5 is a detail transverse section taken substantially on the horizontal line 5—5 of Figure 1.

Referring now to these figures, the frame of my improved implement includes a pair of spaced parallel side strips 10 and 11, preferably bent from a single piece of material and having a filler block 12 securely fixed between their connected ends, as by means of screws and the like 13, to form a handle. At a point below the above handle, there is journalled transversely through the side members 10 and 11 a crank shaft 14 having a crank 15 between the side members and having one externally projecting end upon which is secured a gear member 16. Above the crank shaft, a stub shaft 17 is journalled transversely through the side member 11 and has a gear 18 secured thereon, somewhat larger than, and in mesh with, the gear 16 of the crank shaft. In the preferred arrangement the two gears 16 and 18 are externally of the frame and within the confines of a bracket 19 whose offset ends 20 are riveted, welded or otherwise secured to the frame side member 11. In this arrangement the external portions of the crank shaft 14 and stub shaft 17 project laterally beyond the bracket 19 for selective engagement by a crank handle 21 having a socket and set screw 22 applicable alike to either of the shafts so that the crank shaft may be driven directly by applying the crank handle to the end thereof, or through the gears 18 and 16, if increased speed is desired, by applying the crank handle 21 to the outer end of stub shaft 17.

Below the lowermost throw or movement of the crank 15, the frame side members 10 and 11 are offset inwardly as at 23 so that their lower extensions 10a and 11a are in more closely spaced relation, the lower extremities of these latter extensions of the frame side members being rounded as shown at 24, to form presser feet for smooth uniform travel upon the goods to be operated upon which are ordinarily held in a stretcher frame and the like during the turfing operation.

Adjacent to the lower rounded ends 24, each of the extensions 10a and 11a has a pair of openings 26, either of which is adapted to receive one of the intermediate side extensions 27 of a needle guide plate 25 extending between the extensions 10a and 11a. Guide plate 25 may thus be adjusted by springing the extensions 10a and 11a apart sufficiently to withdraw its extensions 27 from one set of openings 26 and insert them within the other set.

The guide plate 25 has an opening 29 through which the lower end of the needle 30 is movable, the upper end of the needle being adjustable in the lower portion of the tubular holder 31 and clamped therein by a set screw 32 threaded through the wall of the holder. The upper end of the holder has a flat coiled integral extension 33 encircling the crank 15 of the crank shaft and this holder is also provided adjacent to its upper end and between the frame extensions with an outstanding guide and tension eye 34 for the turfing thread in use, it being understood that the term thread is here employed to include cord, yarn, narrow fabric strips or other similar material capable of employment in the turfing operation. It will also be noted that one frame extension 10a likewise has a laterally outstanding thread guide eye 35, located approximately in a horizontal line with the guide eye 34 of the needle holder when the latter is in the lowermost position of its travel as indicated in Figure 1.

The two guides 34 and 35 coact in operation not only to guide the thread employed and keep it out of the way of the operator of the implement, but also serve to place just the required amount of tension necessary to smooth even operation and uniform loops through the material being turfed.

While various forms of needles may be employed in connection with my improved implement, I prefer a needle 30 such as shown in Figure 3 having a hollow body cylindrical at one end at 36 where it is held within the holder 31 and having its remaining portion tapered and longitudinally slotted through one side as at 37. Adjacent to the upper end of the longitudinal slot 37 the needle has a thread receiving aperture 38 and at the opposite end of the slot the needle is provided with a generally triangular point 39 immediately above which is a thread outlet opening 40.

In operation the implement is held in an upright position upon the material to be turfed and lightly pressed with its lower presser feet 24 in engagement therewith. By means of the crank handle 21, the crank shaft is rotated in either direction, and it is obvious from an inspection of Figure 2 that since the needle works through the goods in a straight line inclined with respect to the vertical axis of the implement, the latter will be gradually fed or moved along the surface of the goods as the successive stitches are taken. It is furthermore obvious that by the permitted vertical adjustment of the guide plate 25, the length of the stitches may be regulated and it is likewise obvious that by virtue of the adjustment of the needle 30 in the needle holder 31, the lengths of the loops formed below the goods being turfed may likewise be regulated.

By shifting the crank handle from the crank shaft to the stub shaft or vice versa, the speed of operation may be regulated as before described and it is not only obvious that movement of the implement as a whole in use is controlled by the direction of rotation imparted to the crank shaft, but it is likewise obvious that in disuse, with the crank 15 in upper position, or at the uppermost limit of its throw, the needle 30 is substantially retracted and, with the holder 31, lies wholly between the side portions of the frame where it is fully protected when the implement is laid away or when packed for shipment.

What I claim is:

1. In a turfing implement, a frame consisting of spaced apart parallel side members formed of a single piece of material and integrally joined at one end, the opposite ends of said side members being rounded to form presser feet, a filler block secured between said side members adjacent to their connected ends to form a handle, a needle guide between said members adjacent to their rounded ends and adjustable with respect thereto, a crank shaft journalled transversely through said members intermediate their ends and having its crank positioned therebetween, a gear on the crank shaft, a stub shaft journalled in the frame, a gear on the stub shaft of greater size than the crank shaft gear and in mesh therewith, said stub shaft and said crank shaft having projecting end portions, a crank handle having means selectively attachable to the projecting portions of either the crank shaft or stub shaft, a tubular holder having an integral extension at one end encircling the shaft crank, a needle telescoping within the other end of said holder, and a set screw threaded in connection with the holder for engaging and clamping the needle in adjusted positions.

2. In a turfing implement, a frame consisting of parallel, spaced apart side members rounded at one end to form presser feet, a needle guide between said members adjacent to, and adjustable toward and away from said presser feet, a crank shaft journalled transversely through said members intermediate the ends thereof and having a crank therebetween, a handle for rotating the said shaft, a needle holder engaging said crank shaft at one end, a needle adjustably clamped in the other end of said holder and extending through said guide, and a pair of thread guides, one of which is carried by the frame and the other of which is carried by said needle holder.

3. In a turfing implement, a frame consisting of parallel, spaced apart side members rounded at one end to form presser feet, a needle guide between said members adjacent to, and adjustable toward and away from said presser feet, a crank shaft journalled transversely through said members intermediate the ends thereof and having a crank therebetween, a handle for rotating the said shaft, a needle holder engaging said crank shaft at one end, a needle adjustably clamped in the other end of said holder and extending through said guide, and a pair of thread guides, one of which is carried by the frame and the other of which is carried by said needle holder, said thread guides being substantially in horizontal line when the needle holder is at the limit of its travel in one direction.

4. In a turfing implement, a frame consisting of parallel, spaced apart side members rounded at one end to form presser feet, a needle guide between said members adjacent to, and adjustable toward and away from said presser feet, a crank shaft journalled transversely through said members intermediate the ends thereof and having a crank therebetween, a handle for rotating the said shaft, a needle holder engaging said crank shaft at one end, a needle adjustably clamped in the other end of said holder and extending through said guide, and a pair of thread guides, one of which is carried by the frame and the other of which is carried by said needle holder, said needle holder being of tubular form and having a flat curled extension at one end encircling the crank of said crank shaft.

5. In a turfing implement, a frame consisting of spaced apart parallel side members, rounded at one end to form presser feet, a filler block secured between the opposite ends of said side members and forming a handle, a needle guide adjustably mounted between said side members adjacent to the rounded ends and normally forming a spacer therebetween, a crank shaft journalled transversely through said side members intermediate their ends and having a crank therebetween, a handle for rotating the crank, a needle holder having one end in engagement with the crank of said crank shaft, a needle adjustably clamped in the other end of said holder, and a pair of thread guides, one of which is carried by the holder and the other of which is secured to and laterally outstands from one side member of the frame.

6. In a turfing implement, a frame consisting of spaced apart parallel side members, rounded at one end to form presser feet, a filler block secured between the opposite ends of said side members and forming a handle, a needle guide adjustably mounted between said side members adjacent to the rounded ends and normally forming a spacer therebetween, a crank shaft journalled transversely through said side members intermediate their ends and having a crank therebetween, a handle for rotating the crank, a needle holder having one end in engagement with the crank of said crank shaft, a needle adjustably clamped in the other end of said holder, and a pair of thread guides, one of which is carried by the holder and the other of which is secured to and laterally outstands from one side member of the frame, said frame carried thread guide being positioned thereon to substantially align horizontally with the thread guide of the holder when the latter is at the lowermost limit of its travel.

HERMAN KOHANEK.